US012725119B2

(12) United States Patent
Nguyenquang et al.

(10) Patent No.: US 12,725,119 B2
(45) Date of Patent: Sep. 1, 2026

(54) STORAGE SHELF MANAGEMENT SYSTEM, STORAGE SHELF MANAGEMENT METHOD, AND RECORDING MEDIUM STORING STORAGE SHELF MANAGEMENT PROGRAM

(71) Applicant: SHARP KABUSHIKI KAISHA, Sakai City (JP)

(72) Inventors: Thinh Nguyenquang, Sakai City (JP); Akihiro Yamakawa, Sakai City (JP); Eiji Kurimoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 45 days.

(21) Appl. No.: 19/062,259

(22) Filed: Feb. 25, 2025

(65) Prior Publication Data

US 2025/0299155 A1 Sep. 25, 2025

(30) Foreign Application Priority Data

Mar. 22, 2024 (JP) ................................ 2024-046027

(51) Int. Cl.
*G06Q 10/087* (2023.01)
*G06Q 10/083* (2024.01)

(52) U.S. Cl.
CPC ....... *G06Q 10/087* (2013.01); *G06Q 10/0838* (2013.01)

(58) Field of Classification Search
CPC .................................................. G06Q 10/087
See application file for complete search history.

(56) References Cited

U.S. PATENT DOCUMENTS

2018/0215539 A1* 8/2018 Kimura .................. B65G 1/026
2023/0192405 A1 6/2023 Fujisawa

FOREIGN PATENT DOCUMENTS

JP 2022-007096 A 1/2022
JP 2023065916 A * 5/2023

* cited by examiner

*Primary Examiner* — A. Hunter Wilder
(74) *Attorney, Agent, or Firm* — ScienBiziP, P.C.

(57) ABSTRACT

A management server includes an acquisition processing circuit that acquires an individual delivery processing time when each of a plurality of storage shelves are arranged at each of a plurality of arrangement positions, a prediction processing circuit that acquires delivery prediction information of the storage shelf, an evaluation processing circuit that evaluates combination delivery processing times corresponding to a plurality of arrangement position combinations, based on the individual delivery processing time and the delivery prediction information, and a determination processing circuit that determines one arrangement position combination, from among the plurality of arrangement position combinations, based on the combination delivery processing time.

18 Claims, 14 Drawing Sheets

D1

| PRODUCT ID | PRODUCT NAME | SHELF ID |
|---|---|---|
| 0001 | PRODUCT A | T1 |
| 0002 | PRODUCT B | T2 |
| 0003 | PRODUCT C | T3 |
| ... | ... | ... |

| UNIT ORDER ID | CUSTOMER ID | ORDERED PRODUCT | QUANTITY | ORDER DATE AND TIME |
|---|---|---|---|---|
| O1 | CUSTOM1 | PRODUCT E | 2 | ··· |
| O2 | CUSTOM1 | PRODUCT F | 3 | ··· |
| O3 | CUSTOM2 | PRODUCT G | 5 | ··· |
| O4 | CUSTOM2 | PRODUCT H | 5 | ··· |

| SET ORDER ID | UNIT ORDER ID | SHELF ID |
|---|---|---|
| SET1 | O1, O2, O3, O4 | T3 |
| SET2 | ··· | ··· |
| ··· | ··· | ··· |

| PRODUCT ID | ARRANGEMENT POSITION | DELIVERY PROCESSING TIME | SHELF ATTRIBUTE | PRODUCT ATTRIBUTE |
|---|---|---|---|---|
| 0001 | T1 | t1 | ... | FOOD |
| 0002 | T2 | t2 | ... | DAILY NECESSITY |
| 0003 | T3 | t3 | ... | ELECTRIC APPLIANCE |
| ... | ... | ... | ... | ... |

FIG. 8

ProcessTime[i][j][t]=Pos[i][j][t] × Orders[t]

| Pos[i][j][t] | j=1 | j=2 | j=3 | j=4 | j=5 | j=6 | j=7 | j=8 | j=9 | Order (NUMBER OF ORDERS) |
|---|---|---|---|---|---|---|---|---|---|---|
| i=1 | 9 | 8 | 6 | 20 | 7 | 5 | 6 | 6 | 4 | 10 |
| i=2 | 9 | 8 | 6 | 25 | 7 | 5 | 6 | 6 | 4 | 20 |
| i=3 | 9 | 8 | 6 | 16 | 7 | 7 | 6 | 6 | 5 | 30 |
| i=4 | 9 | 8 | 6 | 10 | 7 | 7 | 6 | 6 | 5 | 10 |
| i=5 | 9 | 8 | 6 | 12 | 7 | 6 | 6 | 6 | 4 | 20 |
| i=6 | 9 | 8 | 6 | 15 | 7 | 5 | 6 | 6 | 4 | 30 |
| i=7 | 9 | 8 | 6 | 40 | 7 | 5 | 6 | 6 | 4 | 10 |
| i=8 | 9 | 8 | 6 | 15 | 7 | 5 | 6 | 6 | 4 | 20 |
| i=9 | 9 | 8 | 6 | 24 | 7 | 5 | 6 | 6 | 4 | 30 |

FIG. 12

MoveTime[i][j][t]=Dist[i][j][t] × Orders[t]

| Dist[i][j][t] | j=1 | j=2 | j=3 | j=4 | j=5 | j=6 | j=7 | j=8 | j=9 | Order (NUMBER OF ORDERS) |
|---|---|---|---|---|---|---|---|---|---|---|
| i=1 | 90 | 80 | 60 | 80 | 70 | 50 | 80 | 60 | 40 | 10 |
| i=2 | 90 | 80 | 60 | 80 | 70 | 50 | 80 | 60 | 40 | 20 |
| i=3 | 90 | 80 | 60 | 85 | 70 | 50 | 80 | 60 | 40 | 30 |
| i=4 | 90 | 80 | 60 | 80 | 70 | 50 | 80 | 60 | 40 | 10 |
| i=5 | 90 | 80 | 60 | 90 | 70 | 50 | 80 | 60 | 40 | 20 |
| i=6 | 90 | 80 | 60 | 80 | 70 | 50 | 80 | 60 | 40 | 30 |
| i=7 | 90 | 80 | 60 | 80 | 70 | 50 | 80 | 60 | 40 | 10 |
| i=8 | 90 | 80 | 60 | 80 | 70 | 50 | 80 | 60 | 40 | 20 |
| i=9 | 90 | 80 | 60 | 80 | 70 | 50 | 80 | 60 | 40 | 30 |

FIG. 13

STORAGE SHELF MANAGEMENT SYSTEM, STORAGE SHELF MANAGEMENT METHOD, AND RECORDING MEDIUM STORING STORAGE SHELF MANAGEMENT PROGRAM

INCORPORATION BY REFERENCE

This application is based upon and claims the benefit of priority from the corresponding Japanese Patent Application No. 2024-046027 filed on Mar. 22, 2024, the entire contents of which are incorporated herein by reference.

BACKGROUND

The disclosure relates to a technique for arranging a storage shelf that stores an article.

In a warehouse or the like, a storage shelf management system is introduced that performs delivery by moving a storage shelf, which is arranged in a storage area and on which an article is stored, to a predetermined location (a delivery location of the article, or the like). Further, in the above-described system, there is known a technique in which storage shelves are moved so that an empty row is formed in one direction, and when a necessary storage shelf is moved to a predetermined location, an unneeded storage shelf is moved to the empty row.

In a system that performs delivery by moving the storage shelf itself, a retrieval time is significantly affected by an arrangement location of the storage shelf. Therefore, it is desirable to arrange each of the storage shelves at an optimum position in preparation for a future delivery request.

SUMMARY

An object of the disclosure is to provide a storage shelf management system, a storage shelf management method, and a recording medium storing a storage shelf management program that are capable of arranging each of storage shelves at an optimum position in a system that delivers the storage shelves.

A storage shelf management system according to an aspect of the disclosure is a storage shelf management system that determines, with respect to a plurality of arrangement positions, an arrangement position combination of a plurality of movable storage shelves storing articles. The storage shelf management system includes an acquisition processing circuit, a prediction processing circuit, an evaluation processing circuit, and a determination processing circuit. The acquisition processing circuit acquires an individual delivery processing time when each of the plurality of storage shelves is arranged at each of the plurality of arrangement positions. The prediction processing circuit acquires delivery prediction information of the storage shelf. The evaluation processing circuit evaluates combination delivery processing times corresponding to a plurality of the arrangement position combinations, based on the individual delivery processing time and the delivery prediction information. The determination processing circuit determines one arrangement position combination, from among the plurality of arrangement position combinations, based on the combination delivery processing time.

A storage shelf management method according to another aspect of the present disclosure is a storage shelf management method that determines an arrangement position combination of a plurality of movable storage shelves that are arranged at a plurality of arrangement positions and that store articles. In the storage shelf management method, one or more processing circuits perform processes including acquiring an individual delivery processing time when each of the plurality of storage shelves is arranged at each of the plurality of arrangement positions, acquiring delivery prediction information of the storage shelf, evaluating combination delivery processing times corresponding to a plurality of the arrangement position combinations, based on the individual delivery processing time and the delivery prediction information, and determining one arrangement position combination, from among the plurality of arrangement position combinations, based on the combination retrieval processing time.

A recording medium according to another aspect of the disclosure is a recording medium storing a storage shelf management program that determines an arrangement position combination of a plurality of movable storage shelves that are arranged at a plurality of arrangement positions and that store articles. A storage shelf management program causes one or more processing circuits to perform processes including acquiring an individual delivery processing time when each of the plurality of storage shelves is arranged at each of the plurality of arrangement positions, acquiring delivery prediction information of the storage shelf, evaluating combination delivery processing times corresponding to a plurality of the arrangement position combinations, based on the individual delivery processing time and the delivery prediction information, and determining one arrangement position combination, from among the plurality of arrangement position combinations, based on the combination delivery processing time.

According to the disclosure, it is possible to provide a storage shelf management system, a storage shelf management method, and a recording medium storing a storage shelf management program that are capable of arranging each of storage shelves at an optimum position in a system that delivers the storage shelves.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a table showing an example of product information utilized in the storage shelf management system according to the embodiment of the disclosure.

FIG. 6 is a table showing an example of order information utilized in the storage shelf management system according to the embodiment of the disclosure.

FIG. 7 is a table showing an example of transport information utilized in the storage shelf management system according to the embodiment of the disclosure.

FIG. 8 is a table showing an example of history information utilized in the storage shelf management system according to the embodiment of the disclosure.

FIG. 12 is a view illustrating a calculation example of a ProcessTime (process time) objective function according to the embodiment of the disclosure.

FIG. 13 is a view illustrating a calculation example of a MoveTime (move time) objective function according to the embodiment of the disclosure.

DETAILED DESCRIPTION

Embodiments of the disclosure will be described below with reference to the drawings for an understanding of the disclosure. Note that the following embodiments are specific examples of the disclosure, and do not limit the technical scope of the disclosure.

Management System 10

Figure 1:
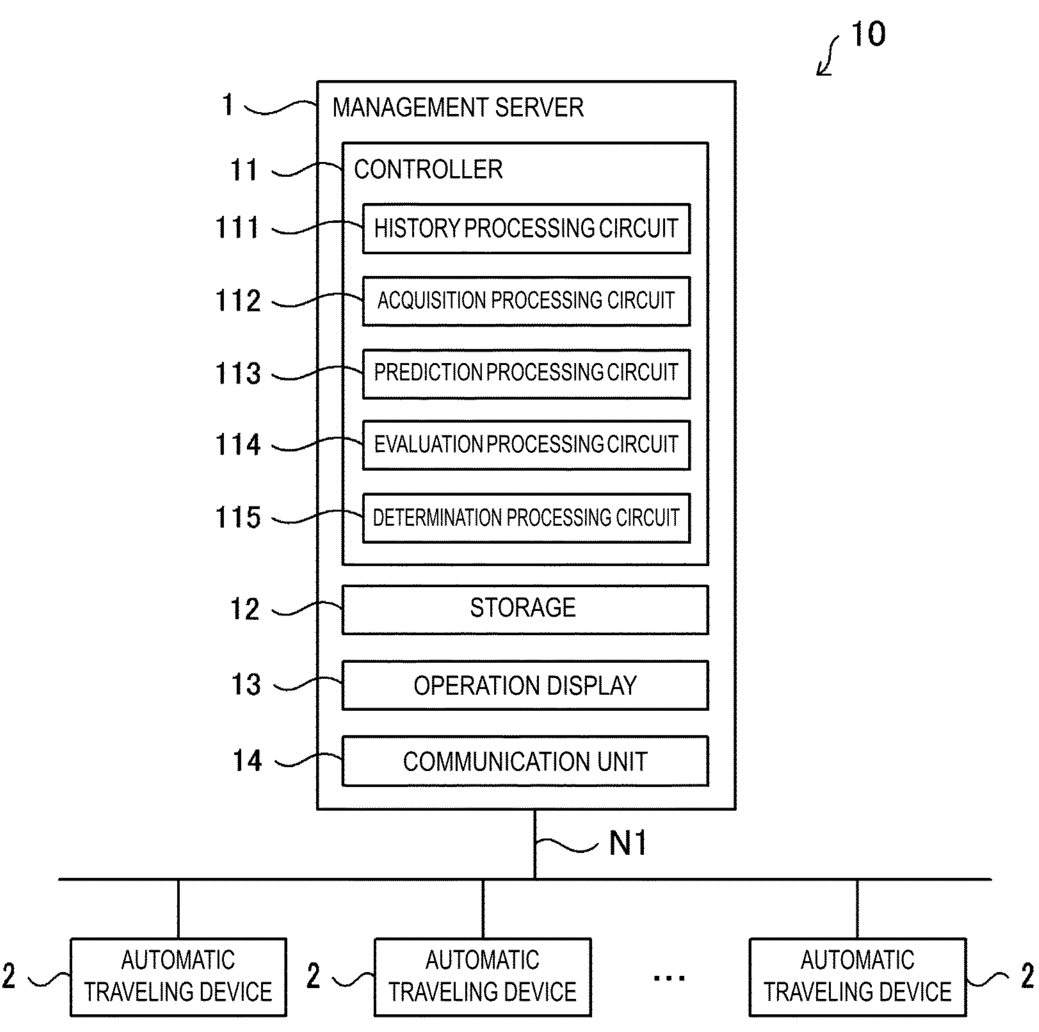
FIG. 1 is a block diagram illustrating a configuration of a storage shelf management system according to an embodiment of the disclosure.

As illustrated in FIG. 1, a management system 10 according to an embodiment of the disclosure includes a management server 1 and an automatic traveling device 2 (also referred to as an automated guided vehicle (AGV) or an unmanned transport device). The management server 1 and the automatic traveling device 2 can communicate with each other via a communication network N1 such as a wireless local area network (LAN).

The management system 10 is a system capable of guiding the automatic traveling device 2 by detecting a plurality of tags arranged on a floor surface. For example, the automatic traveling device 2 travels along a travel route set in advance while detecting a two-dimensional code (or a marker or the like) arranged on (adhered to) the floor surface. The management system 10 includes one or more of the automatic traveling devices 2.

Further, for example, in a travel area provided with a plurality of paths on which the automatic traveling device 2 can travel, the management system 10 designates, among the plurality of paths, a path on which the automatic traveling device 2 should travel as the travel route, and causes the automatic traveling device 2 to transport a transport target from a storage position to a target position. The management system 10 is applied to a facility such as a factory or a warehouse that stores products, for example. For example, upon receipt of an order for a product from a customer (customer terminal), the management system 10 outputs travel instructions (a transport request) to the automatic traveling device 2. Upon acquisition of the travel instructions, the automatic traveling device 2 moves to the storage position (storage shelf) of the product, couples to the storage shelf, and transports the storage shelf to a picking area. In the picking area, a worker removes a target product (ordered product) from the storage shelf and transports the product to a delivery area. The customer can utilize an information processing device (customer terminal), such as a personal computer or a smartphone, to access a website (order page) operated by an order server (not illustrated) and can place an order for a product.

The order server can receive an order for a product from each of a plurality of the customer terminals, and collects and outputs each of received order information to the management server 1. The management server 1 manages the operation of each of the plurality of automatic traveling devices 2, and outputs the travel instructions to each of the automatic traveling devices 2 on the basis of the order information. The automatic traveling device 2 autonomously travels on the travel route set in advance based on the travel instructions, and moves the storage shelf storing the product included in the order information to the picking area.

Figure 2:
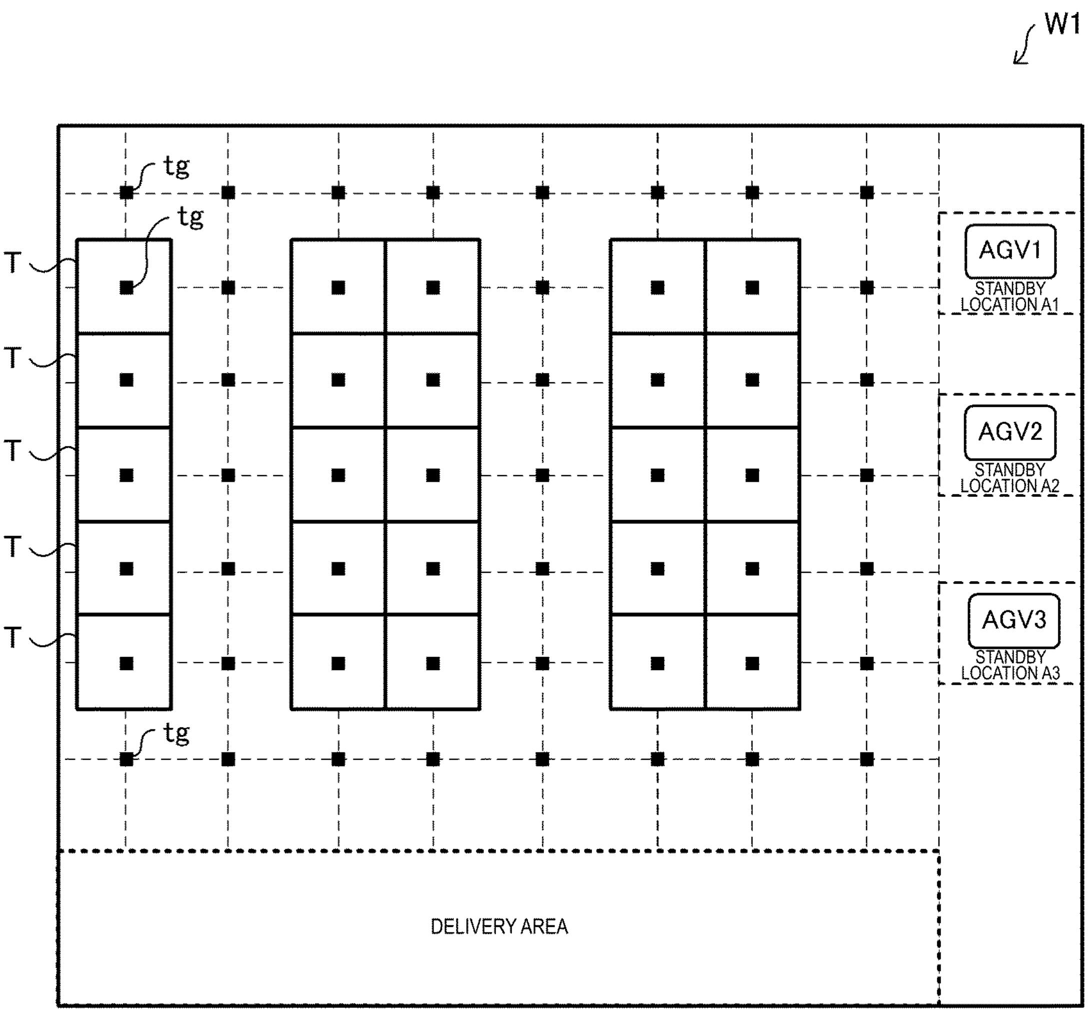
FIG. 2 is a view schematically illustrating a configuration of a facility to which the storage shelf management system according to the embodiment of the disclosure is applied.

FIG. 2 illustrates an example of a facility W1 to which the traveling system 10 is applied. In the facility W1 illustrated in FIG. 2, a plurality of storage shelves T (transport targets), which store products, are arranged. Twenty-five of the storage shelves T are illustrated in FIG. 2. Further, in the facility W1, standby locations for the automatic traveling devices 2 are set. For example, in the facility W1, a standby location A1 where an AGV1 (automatic traveling device 2) stands by, a standby location A2 where an AGV2 (automatic traveling device 2) stands by, and a standby location A3 where an AGV3 (automatic traveling device 2) stands by are set. Each of the automatic traveling devices 2 stands by at the predetermined standby location when the travel instructions are not received from the management server 1.

In the facility W1, tags tg are arranged on a floor surface of a travelable region of the automatic traveling device 2. The tag tg is constituted by a two-dimensional code, a marker, a radio frequency identification (RFID), or the like. A region in which the tags tg are arranged is the travelable region of the automatic traveling device 2. As illustrated in FIG. 2, the tags tg are arranged at equal intervals at positions where the storage shelves T are arranged and on paths between the storage shelves T. A plurality of the tags tg are also arranged at equal intervals in areas (passage areas) where the storage shelves T are not arranged.

Figure 3:
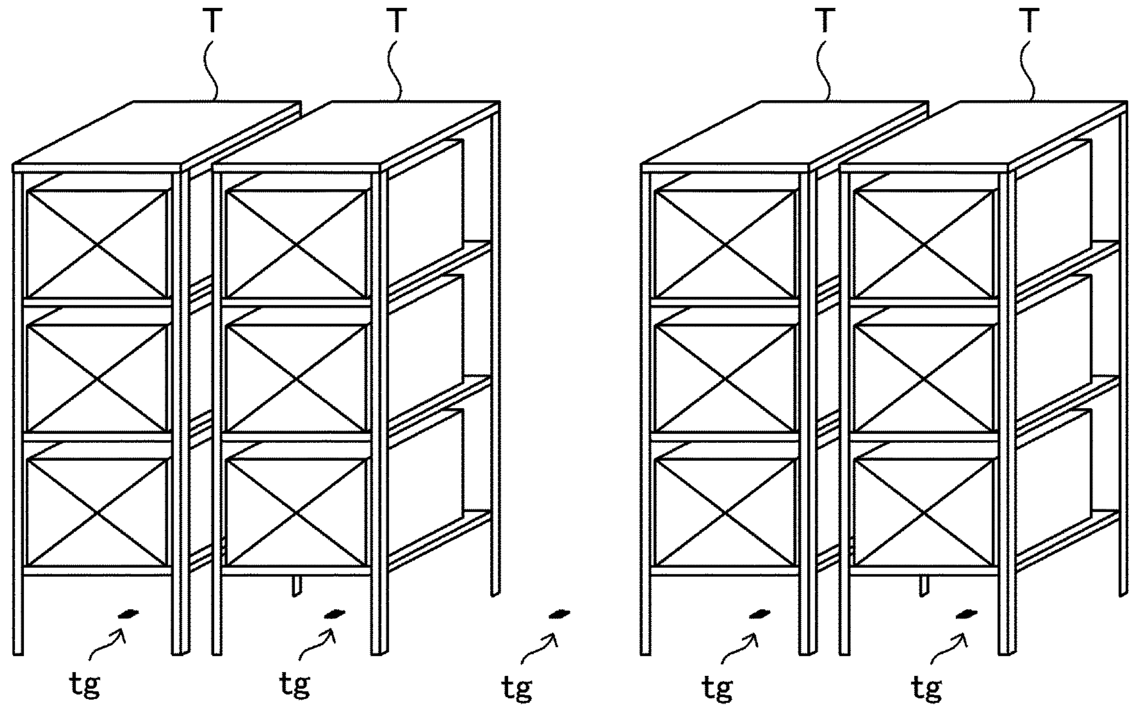
FIG. 3 is an external view illustrating an example of storage shelves according to the embodiment of the disclosure.
Figure 4:
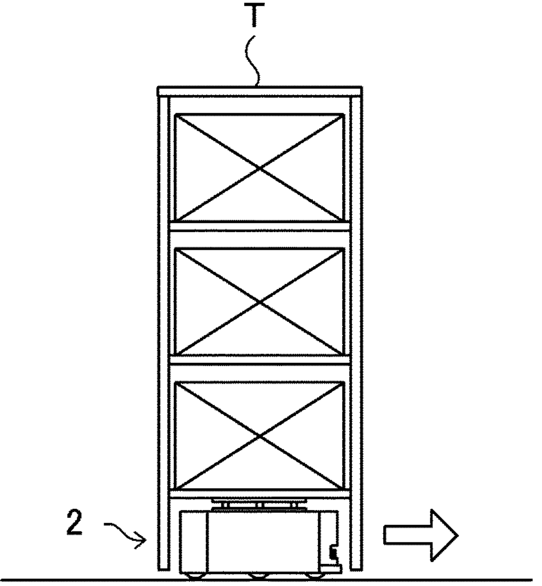
FIG. 4 is a view illustrating an example of a storage shelf transport method according to the embodiment of the disclosure.

For example, as illustrated in FIG. 3, the tag tg is arranged at a center position of the storage shelf T and a center position between the storage shelves T. The storage shelf T includes a plurality of storage compartments (storage compartments on three levels in FIG. 3) in which the products are placed, and a space into which the automatic traveling device 2 can enter is formed at a lowermost level. As illustrated in FIG. 4, upon reaching the storage shelf T storing the target product, the automatic traveling device 2 can enter under the storage shelf T, couple to (lift) the storage shelf T using a coupler, and move together with the storage shelf T. The automatic traveling device 2 according to the present embodiment has a configuration in which the automatic traveling device 2 lifts and moves the storage shelf T. However, as another embodiment, when the storage shelf T includes wheels, the automatic traveling device 2 may be configured to tow the storage shelf T.

Since the space is formed at the lowermost level of the storage shelf T, the automatic traveling device 2 can pass under the storage shelf T. In other words, in the present embodiment, not only regions where the storage shelves T are not arranged (regions between the storage shelves T) but also regions where the storage shelves T are arranged can be utilized as the paths on which the automatic traveling device 2 can travel.

Upon acquisition of the travel instructions from the management server 1, each of the automatic traveling devices 2 moves from the standby location to the storage shelf T that stores the ordered product. For example, upon acquisition of the travel instructions including the product of the storage shelf T in the order information from the management server 1, the AGV1 moves to the position of a storage shelf T1 in accordance with the travel route set in advance, couples to (loads) the storage shelf T1, and moves (transports) the storage shelf T1 to a delivery location. When the worker removes the ordered product from the storage shelf T1, the automatic traveling device 2 moves to a predetermined position (storage area) in accordance with the travel route set in advance.

That is, the management system 10 controls the traveling of the automatic traveling device 2 that travels while sequentially detecting the plurality of tags tg arranged on the floor surface and is capable of transporting, to a designated position (delivery area), the storage shelf T stored at the position corresponding to some of the tags tg (storage position identification tags), of the plurality of tags tg. Each of the storage shelves T is moved between the storage area and the delivery area by the automatic traveling device 2. A position of each of the storage shelves T in the storage area is not fixed, and the storage shelf T is managed so as to be movable to a desired position.

In the present embodiment, the management system 10 corresponds to a storage shelf management system according to the disclosure. However, the storage shelf management system according to the disclosure may be constituted by the management server 1 alone, or may include one or more constituent elements of the management server 1 and the automatic traveling device 2.

Management Server 1

As illustrated in FIG. 1, the management server 1 is a server including a controller 11, a storage 12, an operation display 13, a communication unit 14, and the like. Note that the management server 1 is not limited to being a single computer, and may be a computer system in which a plurality of computers operate in cooperation with each other. The various types of processing executed by the management server 1 may be distributed and executed by one or more processing circuits.

The communication unit 14 is a communication interface for connecting the management server 1 to the communication network N1 in a wired or wireless manner and executing data communication with one or more of the automatic traveling devices 2 via the communication network N1 in accordance with a predetermined communication protocol.

The operation display 13 is a user interface including a display such as a liquid crystal display or an organic electroluminescent (EL) display that displays various types of information, and an operation unit such as a mouse, a keyboard, or a touch panel that receives an operation.

The storage 12 is a non-volatile storage such as a hard disk drive (HDD), a solid state drive (SSD), or a flash memory that stores various types of information. For example, the storage 12 stores product information D1, order information D2, transport information D3, and history information D4. The product information includes information related to the products stored in the facility W1. The order information includes information related to the customer order. The transport information D3 includes information related to the storage position of the product corresponding to the customer order. The history information D4 includes information related to past picking operations of the product. FIG. 5 is a table showing an example of the product information D1, FIG. 6 is a table showing an example of the order information D2, FIG. 7 is a table showing an example of the transport information D3, and FIG. 8 is a table showing an example of the history information D4.

As shown in FIG. 5, the product information D1 includes corresponding information for each of the products, such as a "product ID", a "product name", and a "shelf ID". The product ID is identification information of the product, and the product name is a name of the product. The shelf ID is identification information of the storage shelf on which the product is stored. In the present embodiment, as the shelf ID, for example, "T1" indicating the storage shelf T1, "T2" indicating a storage shelf T2, "T3" indicating a storage shelf T3, and the like are registered.

The product information D1 is stored in advance in the storage 12, for example, by a registration operation by an administrator of the facility W1. The administrator can appropriately update the product information D1.

As shown in FIG. 6, the order information D2 includes corresponding information for each of the orders, such as a "unit order ID", a "customer ID", the "ordered product", a "quantity", and an "order date and time". The unit order ID is identification information for one order, and the customer ID is identification information of the customer that has ordered the product. The ordered product is the name of the product ordered by the customer, and the quantity is an order quantity of the ordered product. The order date and time is information of the date and time at which the order is received from the customer.

The order information D2 is registered by the controller 11 each time the management server 1 (or the order server) receives an order from a customer.

As shown in FIG. 7, the transport information D3 includes corresponding information for each of set orders obtained by combining the unit orders, such as a "set order ID", the "unit order ID", and the "shelf ID". The set order ID is identification information of the set order that is obtained by combining the unit orders. The controller 11 generates the set order by combining the unit orders, based on information such as the storage position of the product, the current position of the automatic traveling device 2, and operating rules.

The transport information D3 is included in the travel instructions transmitted to the automatic traveling device 2. For example, when the AGV1 acquires the travel instructions including "SET1" as the transport information D3, the AGV1 moves to the position of the shelf ID "T3" included in the transport information D3. Then, the AGV1 couples to (loads) the storage shelf T3 and moves (transports) the storage shelf T3 to the delivery location. The controller 11 generates the transport information D3 (refer to FIG. 7) with reference to the product information D1 (refer to FIG. 5).

As shown in FIG. 8, the history information D4 includes result information of past delivery processing for each of the products. For example, the history information D4 includes corresponding information for each of the products, such as an "arrangement position", a "delivery processing time", a "shelf attribute", and a "product attribute". corresponding to each item. The arrangement position is the position of the storage shelf on which the product is stored. The delivery processing time is a time taken for the automatic traveling device 2 to transport the storage shelf storing the delivery target product to a shipping location. The shelf attribute is information (characteristic information) related to the storage shelf on which the product is stored, and is information such as the size and shape of the storage shelf, the size of a picking frontage, the size of a storage space, and the size of a work space. The product attribute is information (characteristic information) such as a type (food, daily necessity, electric appliance, etc.), a size, and a weight of the product.

The delivery processing time changes depending on the arrangement position, the shelf attribute, and the product attribute. In addition, since the arrangement position of each of the storage shelves is not necessarily fixed, the storage shelf may be arranged at a different position for each delivery. Thus, for example, for the storage shelf T1 that stores a product A, the delivery processing time when the storage shelf T1 is arranged at a given position may be different from the delivery processing time when the storage shelf T1 is arranged at another position. As described above, the history information D4 includes the arrangement position of the storage shelf, the characteristic information (attribute) of the storage shelf, and the characteristic information (attribute) of the product. Every time the delivery processing is executed, the controller 11 registers the result information of the delivery processing in the history information D4.

Note that, as another embodiment, some or all of the product information D1, the order information D2, the transport information D3, and the history information D4 may be stored in another server accessible from the management server 1 via the communication network N1. In this case, the controller 11 of the management server 1 may acquire the information from the other server and execute various processing, such as arrangement position determination processing (refer to FIG. 14) to be described below.

The storage 12 stores control programs, such as an arrangement position determination program that causes the controller 11 to execute the arrangement position determination processing (refer to FIG. 14) to be described below. For example, the arrangement position determination program is non-temporarily recorded in a computer-readable recording medium such as a compact disc (CD) or a digital versatile disc (DVD), read by a reading device (not illustrated) such as a CD drive or a DVD drive included in the management server 1, and stored in the storage 12.

The controller 11 includes control devices such as a central processing circuit (CPU), a read only memory (ROM), and a random access memory (RAM). The CPU is a processing circuit that executes various types of arithmetic processing. The ROM is a non-volatile storage that stores, in advance, control programs such as a basic input/output system (BIOS) and an operating system (OS) that cause the CPU to execute the various types of arithmetic processing. The RAM is a volatile or non-volatile storage that stores various types of information, and is used as a temporary storage memory (work area) for the various types of processing executed by the CPU. The controller 11 controls the management server 1 by causing the CPU to execute the various types of control programs stored in advance in the ROM or the storage 12.

Specifically, as illustrated in FIG. 1, the controller 11 includes various types of processing circuit, such as a history processing circuit 111, an acquisition processing circuit 112, a prediction processing circuit 113, an evaluation processing circuit 114, a determination processing circuit 115, and the like. Note that the controller 11 functions as the various types of processing circuit by executing various types of processing in accordance with the arrangement position determination program, using the CPU. Further, some or all of the processing circuits may be constituted by an electronic circuit. Note that the arrangement position determination program may be a program that causes a plurality of processing circuits to function as the processing circuits.

Figure 9:
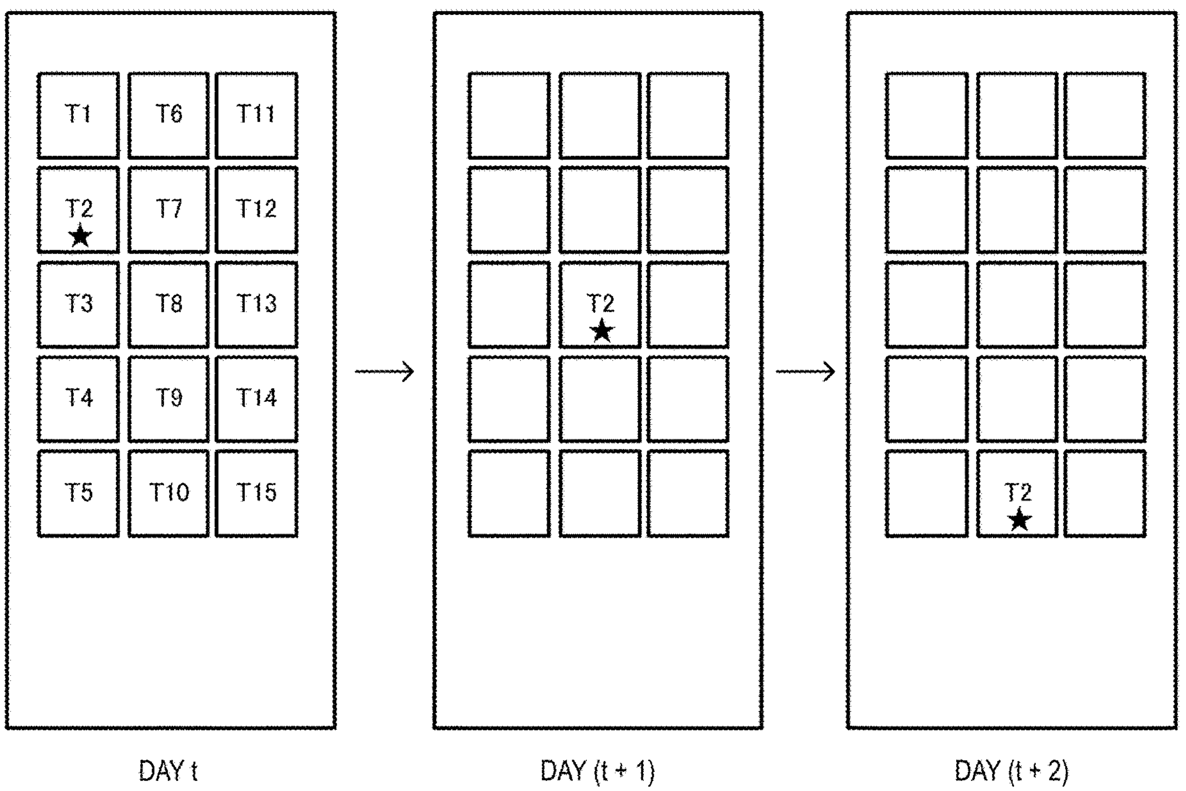
FIG. 9 is a view schematically illustrating a state of re-arranging the storage shelves in the storage shelf management system according to the embodiment of the disclosure.

With respect to the plurality of arrangement positions (storage shelves), the controller 11 executes processing to determine (optimize) a combination (hereinafter referred to as an "arrangement position combination") of optimum arrangement positions of the plurality of movable storage shelves that store the articles. For example, in the facility W1, the delivery target products differ day by day, and a delivery efficiency varies for each day of delivery. In addition, depending on order trends, such as the month and the season, the delivery target products are different. For this reason, it is desirable to determine and rearrange the arrangement positions of each of the storage shelves each day, in order to improve the delivery efficiency. For example, as illustrated in FIG. 9, on a given day (day t), the storage shelf T2 is arranged at a position on the left at the back, on the next day (day (t+1)), the storage shelf T2 is arranged at a center position, and on the following day (day (t+2)), the storage shelf T2 is arranged in the front row. In this way, for example, when shipping is performed for the storage shelf T2 on the (t+2)-th day, the delivery processing can be efficiently executed.

In this way, by rearranging each of the storage shelves according to the delivery (order) trend, the delivery processing can be made more efficient. Specific processing of each of the processing circuits in order to determine the arrangement position combination will be described below.

The history processing circuit 111 acquires delivery history information (the history information D4 in FIG. 8) in which the past delivery processing time for each of the storage shelves is recorded. Specifically, the history processing circuit 111 refers to the history information D4 and acquires the past delivery processing time for each of the storage shelves.

The acquisition processing circuit 112 acquires the individual delivery processing times when each of the plurality of storage shelves is arranged at each of the plurality of arrangement positions. Specifically, the acquisition processing circuit 112 obtains the individual delivery processing times based on the history information D4.

For example, the acquisition processing circuit 112 acquires combination determination target information that includes the characteristic information (shelf attribute) of the combination determination target storage shelf, and the characteristic information (product attribute) of the product. Further, the acquisition processing circuit 112 compares the delivery history information (history information D4) with the combination determination target information, makes a determination of the sameness or similarity of the characteristic information of the storage shelf and the sameness or similarity of the characteristic information of the product, and obtains the individual delivery processing time based on a determination result.

More specifically, as described above, the history information D4 includes the result information of the past delivery processing, such as information related to how long the delivery processing time took when the storage shelf is arranged at a given storage position, for example. The result information further includes the information related to the attribute of the storage shelf (size, shape, and the like of the storage shelf) and the attribute of the product (type, size, weight, and the like of the product). By referring to the results of the delivery processing times for which the attribute of the storage shelf and the attribute of the product are the same or similar, the acquisition processing circuit 112 calculates the delivery processing times (individual delivery processing times) when the plurality of storage shelves are arranged at each of the arrangement positions.

The prediction processing circuit 113 acquires delivery prediction information of the storage shelf. Specifically, the prediction processing circuit 113 acquires the order quantity (predicted order quantity) predicted for each of the products in the future. For example, the prediction processing circuit 113 predicts the order quantity based on a past order history. The prediction processing circuit 113 predicts the order quantity based on the past order history for each of the products for each season, month, day, or time, on trends in the order quantity (refer to FIG. 8), and the like. The prediction processing circuit 113 predicts a number of deliveries, a delivery frequency, and the like for the storage shelf, based on the predicted order quantity.

The evaluation processing circuit 114 evaluates combination delivery processing times, which correspond to the plurality of arrangement position combinations, on the basis of the individual delivery processing times and the delivery prediction information. The evaluation processing circuit 114 does not evaluate the delivery processing time for each individual storage shelf, but performs the evaluation with respect to the arrangement position combinations of the plurality of storage shelves. Specifically, the evaluation processing circuit 114 calculates an objective function including an evaluation term for the combination delivery processing time. For example, the evaluation processing circuit 114 calculates an objective function E(x) using the following equation.

[Equation 1]

$$E(\tilde{x}) = \lambda_1 \sum_{t=1}^{D}\sum_{i=1}^{I}\sum_{j=1}^{J} MoveTime_{i,j,t}x_{i,j,t} \leftarrow \text{First term}$$
$$+\lambda_2 \sum_{t=1}^{D}\sum_{i=1}^{J}\left(\sum_{j=1}^{J} ProcessTime_{i,j,t}x_{i,j,t}\right)^2 \leftarrow \text{Second term}$$
$$+\lambda_3 \sum_{i=1}^{J}\sum_{j=1}^{J}(x_{i,j,t}-1)^2 \leftarrow \text{Third term}$$

For convenience of explanation, the above equation is expressed as follows.

$$E(X) =$$
$$A1 \times SUM1\ (MoveTime\,[i][j][t] \times X[i][j][t]).\ \text{First term}$$
$$+A2 \times SUM2\ (ProcessTime\,[i][j][t] \times X[i][j][t])\char`^2.\ \text{Second term}$$
$$+A3 \times SUM3\ (X[i][j][t]-1)\char`^2.\ \text{Third term}$$

X [i] [j] [t] in the above equation is a determination variable, and indicates that a storage shelf [i], which is in a product group for which an arrangement plan of the storage shelves is to be determined at a post-shipment time point [t] on that day, is arranged at a storage pos [j]. "SUM1" in the first term indicates a movement time of the storage shelf at the time of delivery, and indicates a transport time required to transport the storage shelf from the arrangement position to the shipping location, for example. "SUM2" in the second term indicates the delivery processing time (a storage shelf extraction time) at the time of delivery of the storage shelf. "ProcessTime" in the second term indicates a processing time at the arrangement position of the storage shelf, for example, an operation time required for a delivery operation of the storage shelf. "SUM3" in the third term indicates a constraint condition (penalty) required when arranging the storage shelf, and is, for example, a condition that "each product is arranged on only one storage shelf". In other words, the evaluation term (third term) for the constraint condition is a function that increases the objective function when the same product is placed at two or more arrangement positions. A1 to A3 indicate weightings related to importance.

The evaluation processing circuit 114 calculates the objective function for each of the plurality of arrangement position combinations.

The determination processing circuit 115 determines one arrangement position combination from among the plurality of arrangement position combinations, based on the combination delivery processing time. Specifically, the determination processing circuit 115 determines the arrangement position combination in which the objective function calculated by the evaluation processing circuit 114 is smallest, among the plurality of arrangement position combinations.

Hereinafter, a specific example of determining the arrangement position combination will be described with reference to FIGS. 10 to 13.

Figure 10:
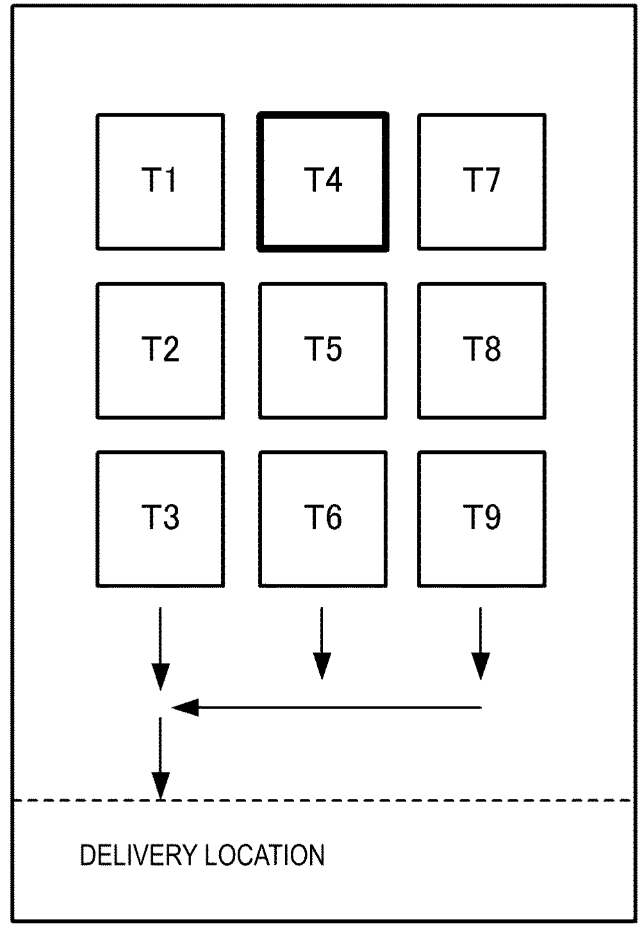
FIG. 10 is a view illustrating an example of an arrangement state of the storage shelves according to the embodiment of the disclosure.
Figure 11:
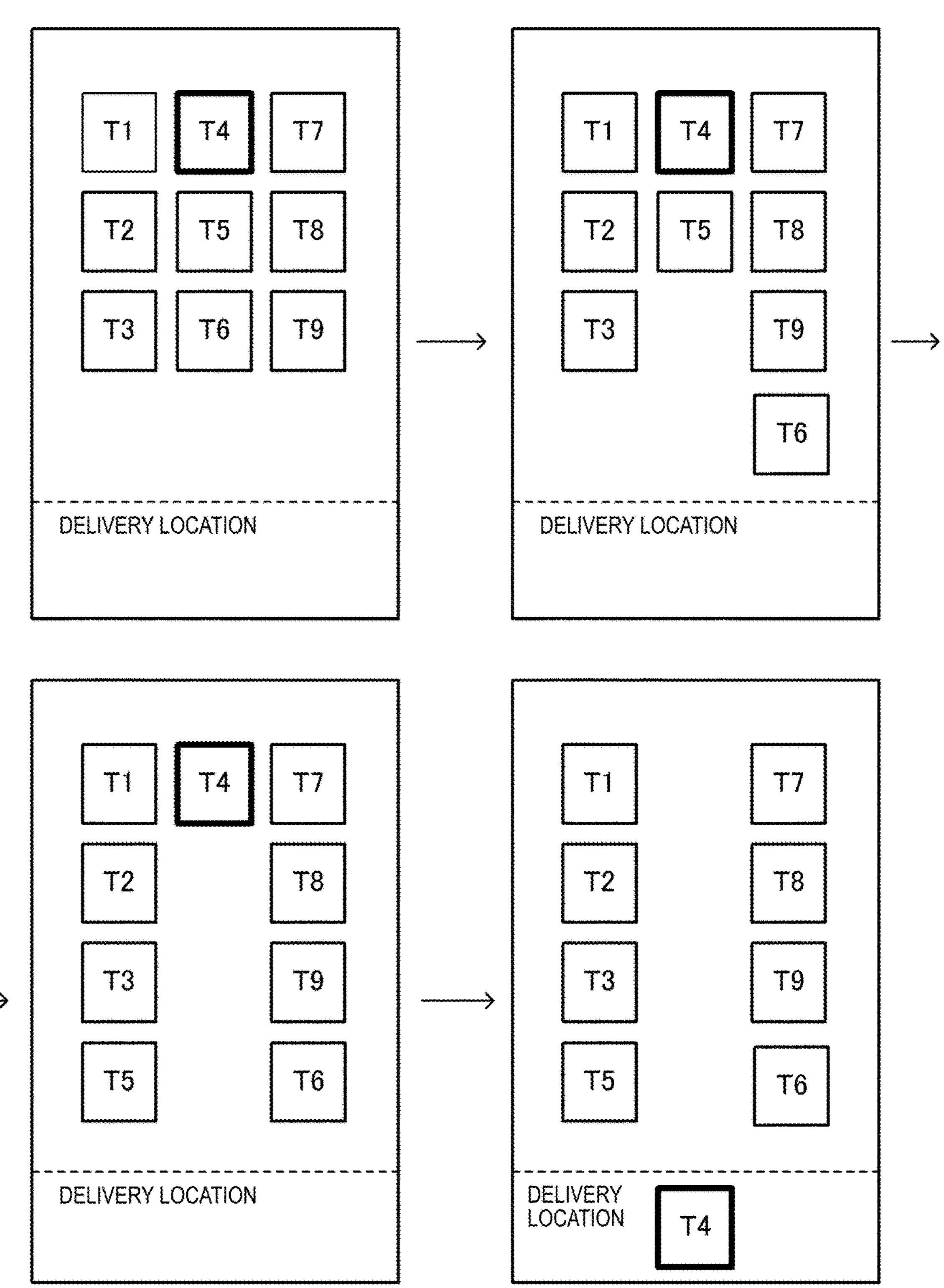
FIG. 11 is a view illustrating an example of delivery processing of the storage shelf according to the embodiment of the disclosure.

Storage shelves T1 to T9 are illustrated in FIG. 10. In addition, FIG. 10 illustrates the current arrangement positions of the storage shelves T1 to T9 on the given day (day t). Each of the storage shelves is transported to the delivery location by the automatic traveling device 2, in accordance with the order. FIG. 11 illustrates an example of a procedure of the delivery processing when the storage shelf T4 is delivered. When the storage shelf T4 is delivered, the storage shelf T5 is moved after the storage shelf T6 has been moved, to secure a movement route of the storage shelf T4, and the storage shelf T4 is transported to the delivery location.

Here, when the storage shelves T1 to T9 are rearranged at appropriate positions in preparation for the orders of the next day (day (t+1)), a plurality of combinations (arrangement position combinations) are conceivable. The controller 11 calculates the objective functions corresponding to all the arrangement position combinations, and determines the arrangement position combination in which the objective function is smallest, from among all the arrangement position combinations.

FIG. 12 shows a calculation example (a cost function calculation result) of "ProcessTime" (process time) in the second term of the above equation. In FIG. 12, "j" indicates the arrangement position (arrangement destination) of the storage shelf, and j=1 to 9 respectively indicate the arrangement positions of the storage shelves T1 to T9 (refer to FIG. 10). "ProcessTime" is calculated by ProcessTime [i] [j] [t]=Pos [i] [j]×[t]>Orders [t]. Pos [i] [j] [t] indicates a delivery operation time when the storage shelf is delivered from the arrangement position. For example, when the storage shelf T4 (i=4) is arranged at the position of the storage shelf T1 (j=1), the cost of the delivery operation time is "9", when the storage shelf T4 (i=4) is arranged at the position of the storage shelf T4 (j=4), the cost of the delivery operation time is "10", and when the storage shelf T4 (i=4) is arranged at the position of the storage shelf T9 (j=9), the cost of the delivery operation time is "5". The values shown in FIG. 12 may be time (seconds). Further, the controller 11 multiplies the delivery operation time (cost) by the predicted order quantity (Orders [t]) (the number of deliveries, for example) to calculate ProcessTime. That is, the controller 11 calculates ProcessTime based on the attribute (characteristic) of the product, the attribute (characteristic) of the storage shelf, the past delivery processing time, and a predicted delivery quantity (number of deliveries).

FIG. 13 shows a calculation example (cost function calculation result) of "MoveTime" (move time) in the first term of the above equation. "MoveTime" is calculated by MoveTime [i] [j] [t]=Dist1 [i] [j] [t]×Orders [t]. Dist1 [i] [j] [t] indicates a transport time when delivering the storage shelf. For example, when the storage shelf T4 (i=4) is arranged at the position of the storage shelf T1 (j=1), the cost of the transport time (the transport time from the position of the storage shelf T1 to the delivering location) is "90", when the storage shelf T4 (i=4) is arranged at the position of the storage shelf T4 (j=4), the cost of the transport time (the transport time from the position of the storage shelf T4 to the delivering location) is "80", and when the storage shelf T4 (i=4) is arranged at the position of the storage shelf T9 (j=9), the transport cost (the transport time from the position of the storage shelf T9 to the shipping location) is "40". Further, the controller 11 calculates MoveTime by multiplying the transport time by the predicted order quantity (Orders [t]) (the number of deliveries, for example). That is, the controller 11 calculates MoveTime based on the attribute (characteristic) of the product, the attribute (characteristic) of the storage shelf, the movement time (transport time) at the time of delivery in the past, and the predicted order quantity (number of deliveries).

Based on the delivery operation time (ProcessTime) and the transport time (MoveTime) calculated as described above, the controller 11 calculates the objective function for all the arrangement position combinations, and determines the arrangement position combination in which the objective function is smallest.

As another embodiment, the controller 11 may determine the arrangement position combination in consideration of the constraint condition. For example, when the constraint condition in the third term of the above equation is the condition that "each product is arranged on only one storage shelf", the controller 11 increases the objective function when the same product is placed on two or more of the storage shelves. In this way, it is possible to exclude the arrangement position combination that does not satisfy the constraint condition.

As described above, the controller 11 determines the arrangement position combination of each of the storage shelves. The controller 11 outputs, to the automatic traveling device 2, information related to the determined arrangement position combination. When the automatic traveling device 2 acquires the information related to the arrangement position combination, the automatic traveling device 2 executes rearrangement processing that changes the arrangement position of each of the products. As another embodiment, the controller 11 may notify the information of the determined arrangement position combination to the administrator or the like of the facility W1 (display the information on an administrator terminal, for example). The administrator rearranges each of the storage shelves based on the information of the arrangement position combination.

In addition to the above-described processing, the controller 11 may be configured to execute processing that causes the automatic traveling device 2 to travel. Specifically, the controller 11 receives the transport request (picking order) for the product corresponding to the automatic traveling device 2, and generates the transport information. Based on the transport request, the controller 11 sets the travel route from the current position of the automatic traveling device 2 to the storage position (storage shelf). For example, the controller 11 performs an operation simulation for all the automatic traveling devices 2, and sets the travel route and control information in which a total of the transport time for all the automatic traveling devices 2 is the shortest. The controller 11 then outputs, to the automatic traveling device 2, travel route information including the travel route and the travel instructions including the control information.

Arrangement Position Determination Processing

Figure 14:
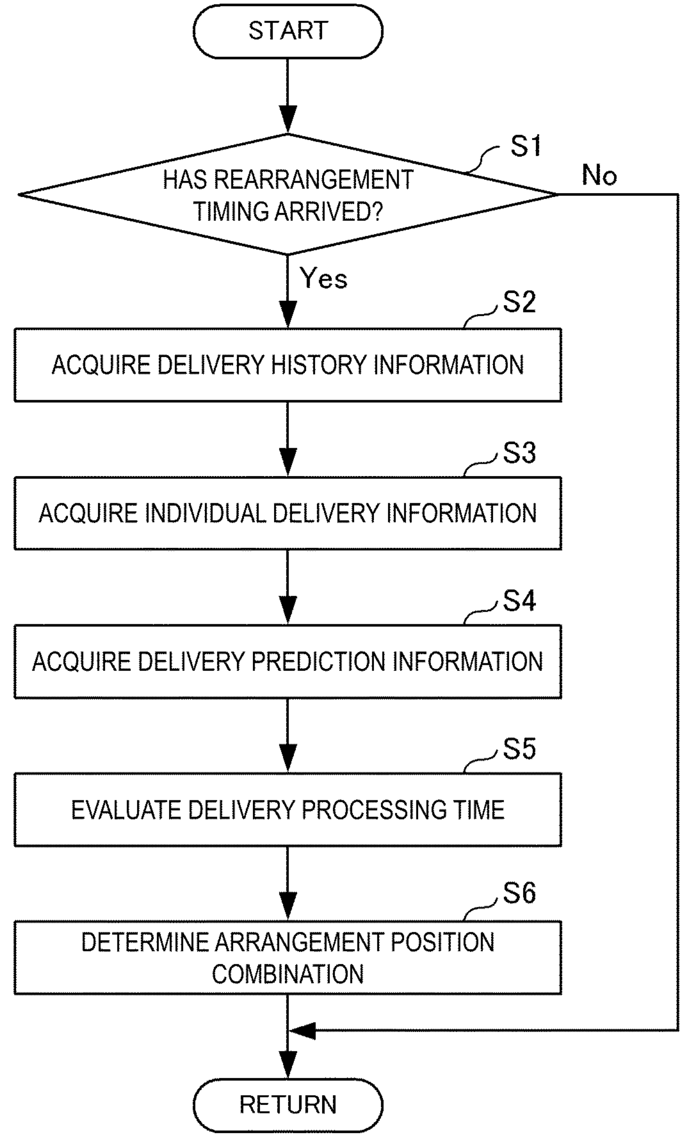
FIG. 14 is a flowchart illustrating an example of a procedure of arrangement position determination processing executed in the storage shelf management system according to the embodiment of the disclosure.

Hereinafter, the arrangement position determination processing executed in the management system 10 will be described with reference to FIG. 14. Specifically, in the present embodiment, the arrangement position determination processing is executed by the controller 11 of the management server 1.

Note that the disclosure can be regarded as the disclosure of an arrangement position determination method that executes one or more steps included in the arrangement position determination processing. Further, the one or more steps included in the arrangement position determination processing described herein may be omitted as appropriate. Note that each of the steps in the arrangement position determination processing may be executed in a different order within a range in which the same effects are obtained. Here, a case in which the controller 11 executes each of the steps in the arrangement position determination processing will be described as an example, but an arrangement position determination method in which one or more processing circuits execute each of the steps in the arrangement position determination processing in a distributed manner is also conceivable as another embodiment.

First, at step S1, the controller 11 determines whether or not a rearrangement timing for the product has arrived. Specifically, the controller 11 determines the rearrangement timing based on the trends in past shipping quantities (refer to FIG. 8). When the controller 11 determines that the rearrangement timing has arrived (S1: Yes), the controller 11 transitions the processing to step S2. The controller 11 stands by until the rearrangement timing arrives (S1: No). The rearrangement timing may be daily, weekly, monthly, or seasonal.

At step S2, the controller 11 acquires the delivery history information. The controller 11 registers the result information of the delivery processing in the history information D4 (refer to FIG. 8) every time the delivery processing is executed. Then, when the rearrangement timing arrives, the controller 11 acquires the history information D4 at that time.

Next, at step S3, the controller 11 acquires the individual delivery processing times. Specifically, the controller 11 calculates the delivery processing time (individual delivery processing time) when each of the plurality of storage shelves is arranged at each of the arrangement positions, by referring to the results of the delivery processing times in which the attribute of the storage shelf and the attribute of the product are the same or similar.

For example, the controller 11 acquires the delivery operation time (Pos [i] [j] [t] shown in FIG. 12) when the storage shelf is delivered from the arrangement position, and the transport time (Dist1 [i] [j] [t] shown in FIG. 13) when the storage shelf is delivered. That is, the individual delivery processing time includes the delivery operation time and the transport time.

Next, at step S4, the controller 11 acquires the delivery prediction information (predicted number of deliveries). Specifically, the controller 11 predicts the order quantity based on the past order history and the trends in the order quantity (shipping quantity) (refer to FIG. 8) of each of the products for each season, month, day, or time, and the like. Then, based on the predicted order quantity, the controller 11 predicts the number of deliveries, the delivery frequency, and the like, of the storage shelf. For example, the controller 11 acquires Orders [t] (predicted number of deliveries) shown in FIGS. 12 and 13.

Next, at step S5, the controller 11 evaluates the delivery processing times. Specifically, the controller 11 evaluates the combination delivery processing times corresponding to the plurality of arrangement position combinations, based on the individual delivery processing times and the delivery prediction information.

For example, the controller 11 calculates ProcessTime based on the delivery operation time (Pos [i] [j] [t]) and the predicted number of deliveries (Orders [t]), calculates Move Time based on the transport time (Dist1 [i] [j] [t]) and the predicted number of deliveries (Orders [t]), and calculates the objective function including the calculated ProcessTime and MoveTime. That is, the evaluation terms for the combination delivery processing time include an evaluation term (the second term of the equation) for the operation time required to perform the delivery operation of the storage shelf at the arrangement position, and an evaluation term (the first term of the equation) for the transport time required to transport the storage shelf from the arrangement position to the predetermined shipping location.

As another embodiment, the objective function may include the constraint condition (for example, the condition that "each product is arranged on only one storage shelf").

The controller 11 calculates the objective function for each of the plurality of arrangement position combinations corresponding to the plurality of storage shelves, and evaluates the delivery processing time (combination delivery processing time) for each of the arrangement position combinations.

Finally, at step S6, the controller 11 determines one of the arrangement position combinations, from among the plurality of arrangement position combinations, based on the combination delivery processing times. Specifically, from among the plurality of arrangement position combinations, the controller 11 determines the one arrangement position combination in which the calculated objective function is smallest.

The controller 11 repeatedly executes the processing at steps S1 to S6 described above each time the rearrangement timing arrives.

As described above, the management system 10 according to the present embodiment is the storage shelf management system that determines the arrangement position combinations of the plurality of storage shelves with respect to the plurality of arrangement positions. The management system 10 acquires the individual delivery processing time when each of the plurality of storage shelves is arranged at each of the plurality of arrangement positions, and acquires the delivery prediction information for the storage shelf. Further, based on the individual delivery processing times and the delivery prediction information, the management system 10 evaluates the combination delivery processing times corresponding to the plurality of arrangement position combinations, and determines the one arrangement position combination, from among the plurality of arrangement position combinations, based on the combination delivery processing time. For example, with respect to the plurality of arrangement position combinations, the management system 10 uses the objective function E(x) to determine one optimum arrangement position combination (the arrangement position combination in which the objective function E(x) is smallest).

According to the above-described configuration, since the arrangement position of the storage shelf can be determined in consideration of the time related to the delivery, such as the operation time when delivering the storage shelf, it is possible to arrange the delivery target storage shelf at an optimum position. Further, since it is possible to reduce a calculation load by using shipping results (the history information D4) that is periodically updated, it is possible to speed up the arrangement position determination processing.

SUPPLEMENTARY NOTES OF DISCLOSURE

Hereinafter, an outline of the disclosure extracted from the above-described embodiments will be described as supplementary notes. Note that configurations and processing functions described in the following supplementary notes can be selected and combined as desired.

Supplementary Note 1

A storage shelf management system is a storage shelf management system that determines, with respect to a plurality of arrangement positions, an arrangement position combination of a plurality of movable storage shelves that store articles, the storage shelf management system including

- an acquisition processing circuit that acquires an individual delivery processing time when each of the plurality of storage shelves is arranged at each of the plurality of arrangement positions,
- a prediction processing circuit that acquires delivery prediction information of the storage shelf,
- an evaluation processing circuit that evaluates combination delivery processing times corresponding to a plurality of the arrangement position combinations, based on the individual delivery processing time and the delivery prediction information, and
- a determination processing circuit that determines one arrangement position combination, from among the plurality of arrangement position combinations, based on the combination delivery processing time.

Supplementary Note 2

The storage shelf management system according to Supplementary Note 1, further including

- a history processing circuit that acquires delivery history information recording a past delivery processing time for each of the storage shelves, wherein
- the acquisition processing circuit acquires the individual delivery processing time based on the delivery history information.

Supplementary Note 3

The storage shelf management system according to Supplementary Note 2, wherein

- the delivery history information includes characteristic information of the storage shelf and characteristic information of the article, and
- the acquisition processing circuit
  - acquires combination determination target information including the characteristic information of the storage shelf that is a target of arrangement position combination determination, and the characteristic information of the article, and
  - acquires the individual delivery processing time based on the sameness or similarity of the characteristic information of the storage shelf and the sameness or similarity of the characteristic information of the article, in a comparison of the delivery history information and the combination determination target information.

Supplementary Note 4

The storage shelf management system according to Supplementary Note 3, wherein the characteristic information of the storage shelf includes information related to a size or a shape of the storage shelf, and the characteristic information of the article includes information related to a type, a size, or a weight of the article.

Supplementary Note 5

The storage shelf management system according to any one of Supplementary Notes 1 to 4, wherein the determination processing circuit calculates an objective function including an evaluation term for the combination delivery processing time, and determines the arrangement position combination in which the objective function is smallest.

Supplementary Note 6

The storage shelf management system according to Supplementary Note 5, wherein evaluation terms for the combination delivery processing time include an evaluation term for an extraction time required to move another storage shelf in order to extract a target storage shelf at a time of delivery, and an evaluation term for a movement time required to move the target storage shelf to a predetermined shipping location at the time of delivery.

Supplementary Note 7

The storage shelf management system according to Supplementary Note 5, wherein the objective function includes an evaluation term for a constraint condition related to an arrangement position of the article.

Supplementary Note 8

The storage shelf management system according to Supplementary Note 7, wherein the evaluation term for the constraint condition is a function that increases the objective function when the storage shelves storing the same article are arranged at two or more of the arrangement positions.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A storage shelf management system that includes one or more processing circuits and determines, with respect to a plurality of arrangement positions, an arrangement position combination of a plurality of movable storage shelves that store articles, the one or more processing circuits performing processes comprising:

acquiring an individual delivery processing time when each of the plurality of storage shelves is arranged at each of the plurality of arrangement positions;

acquiring delivery prediction information of the storage shelf;

evaluating combination delivery processing times corresponding to a plurality of arrangement position combinations, based on the individual delivery processing time and the delivery prediction information;

calculating an objective function including evaluation terms for each of the combination delivery processing times;

determining one arrangement position combination, from among the plurality of arrangement position combinations, based on the combination delivery processing time in which the objective function is smallest; and sending instructions to at least one automatic traveling device to move the plurality of movable storage shelves to the determined one arrangement position combination, wherein evaluation terms for each of the combination delivery processing times include an evaluation term for an extraction time required to move another storage shelf in order to extract a target storage shelf at a time of delivery, and an evaluation term for a movement time required to move the target storage shelf to a predetermined shipping location at the time of delivery.

2. The storage shelf management system according to claim 1, wherein the one or more processing circuits perform processes comprising:

acquiring delivery history information recording a past delivery processing time for each of the storage shelves; and acquiring the individual delivery processing time based on the delivery history information.

3. The storage shelf management system according to claim 2, wherein the delivery history information includes characteristic information of the storage shelf and characteristic information of the article, and the one or more processing circuits perform processes comprising:

acquiring combination determination target information including the characteristic information of the storage shelf that is a target of arrangement position combination determination, and the characteristic information of the article; and acquiring the individual delivery processing time based on the sameness or similarity of the characteristic information of the storage shelf and the sameness or similarity of the characteristic information of the article, in a comparison of the delivery history information and the combination determination target information.

4. The storage shelf management system according to claim 3, wherein the characteristic information of the storage shelf includes information related to a size or a shape of the storage shelf, and the characteristic information of the article includes information related to a type, a size, or a weight of the article.

5. The storage shelf management system according to claim 1, wherein the objective function includes an evaluation term for a constraint condition related to an arrangement position of the article.

6. The storage shelf management system according to claim 5, wherein the evaluation term for the constraint condition is a function that increases the objective function when the storage shelves storing the same article are arranged at two or more of the arrangement positions.

7. A storage shelf management method that determines an arrangement position combination of a plurality of movable storage shelves that are arranged at a plurality of arrangement positions and that store articles, the storage shelf management method comprising:

a storage shelf management method that includes one or more processing circuits performing processes including:

acquiring an individual delivery processing time when each of the plurality of storage shelves is arranged at each of the plurality of arrangement positions, acquiring delivery prediction information of the storage shelf, evaluating combination delivery processing times corresponding to a plurality of arrangement position combinations, based on the individual delivery processing time and the delivery prediction information, calculating an objective function including evaluation terms for each of the combination delivery processing times, determining one arrangement position combination, from among the plurality of arrangement position combinations, based on the combination delivery processing time in which the objective function is smallest, and sending instructions to at least one automatic traveling device to move the plurality of movable storage shelves to the determined one arrangement position combination, wherein evaluation terms for each of the combination delivery processing times include an evaluation term for an extraction time required to move another storage shelf in order to extract a target storage shelf at a time of delivery, and an evaluation term for a movement time required to move the target storage shelf to a predetermined shipping location at the time of delivery.

8. The storage shelf management method according to claim 7, wherein the one or more processing circuits further perform processes including:

acquiring delivery history information recording a past delivery processing time for each of the storage shelves; and acquiring the individual delivery processing time based on the delivery history information.

9. The storage shelf management method according to claim 8, wherein the delivery history information includes characteristic information of the storage shelf and characteristic information of the article, and the one or more processing circuits further perform processes including:

acquiring combination determination target information including the characteristic information of the storage shelf that is a target of arrangement position combination determination, and the characteristic information of the article; and acquiring the individual delivery processing time based on the sameness or similarity of the characteristic information of the storage shelf and the sameness or similarity of the characteristic information of the article, in a comparison of the delivery history information and the combination determination target information.

10. The storage shelf management method according to claim 9, wherein the characteristic information of the storage shelf includes information related to a size or a shape of the storage shelf, and the characteristic information of the article includes information related to a type, a size, or a weight of the article.

11. The storage shelf management method according to claim 7, wherein the objective function includes an evaluation term for a constraint condition related to an arrangement position of the article.

12. The storage shelf management method according to claim 11, wherein the evaluation term for the constraint condition is a function that increases the objective function when the storage shelves storing the same article are arranged at two or more of the arrangement positions.

13. A non-transitory computer-readable recording medium storing a storage shelf management program that determines an arrangement position combination of a plurality of movable storage shelves that are arranged at a plurality of arrangement positions and that store articles, the storage shelf management program causing one or more processing circuits to perform processes comprising:

acquiring an individual delivery processing time when each of the plurality of storage shelves is arranged at each of the plurality of arrangement positions, acquiring delivery prediction information of the storage shelf, evaluating combination delivery processing times corresponding to a plurality of arrangement position combinations, based on the individual delivery processing time and the delivery prediction information, calculating an objective function including evaluation terms for each of the combination delivery processing times, determining one arrangement position combination, from among the plurality of arrangement position combinations, based on the combination delivery processing time in which the objective function is smallest, and sending instructions to at least one automatic traveling device to move the plurality of movable storage shelves to the determined one arrangement position combination, wherein evaluation terms for each of the combination delivery processing times include an evaluation term for an extraction time required to move another storage shelf in order to extract a target storage shelf at a time of delivery, and an evaluation term for a movement time required to move the target storage shelf to a predetermined shipping location at the time of delivery.

14. The non-transitory computer-readable recording medium according to claim 13, wherein the storage shelf management program further causes the one or more processing circuits to perform processes comprising:

acquiring delivery history information recording a past delivery processing time for each of the storage shelves; and acquiring the individual delivery processing time based on the delivery history information.

15. The non-transitory computer-readable recording medium according to claim 14, wherein the delivery history information includes characteristic information of the storage shelf and characteristic information of the article, and the storage shelf management program further causes the one or more processing circuits to perform processes comprising:

acquiring combination determination target information including the characteristic information of the storage shelf that is a target of arrangement position combination determination, and the characteristic information of the article; and acquiring the individual delivery processing time based on the sameness or similarity of the characteristic information of the storage shelf and the sameness or similarity of the characteristic information of the article, in a comparison of the delivery history information and the combination determination target information.

16. The non-transitory computer-readable recording medium according to claim 15, wherein the characteristic information of the storage shelf includes information related to a size or a shape of the storage shelf, and the characteristic information of the article includes information related to a type, a size, or a weight of the article.

17. The non-transitory computer-readable recording medium according to claim 13, wherein the objective function includes an evaluation term for a constraint condition related to an arrangement position of the article.

18. The non-transitory computer-readable recording medium according to claim 17, wherein the evaluation term for the constraint condition is a function that increases the objective function when the storage shelves storing the same article are arranged at two or more of the arrangement positions.

* * * * *